July 26, 1966   E. L. KALLANDER ET AL   3,262,827
FOAM SHEET WITH PRESSURE-SENSITIVE ADHESIVE
COATING AND METHOD OF MAKING SAME
Original Filed Sept. 29, 1959

9 & 10 - RELEASE SHEETS
21 - PRESSURE SENSITIVE ADHESIVE
F - FOAM LAYER

INVENTORS
Ernest L. Kallander
George R. Nelson
by Roberts, Cushman & Grover
ATT'YS United States Patent Office 3,262,827
Patented July 26, 1966

3,262,827
FOAM SHEET WITH PRESSURE-SENSITIVE ADHESIVE COATING AND METHOD OF MAKING SAME
Ernest L. Kallander, Southboro, and George R. Nelson, Framingham, Mass., assignors to Dennison Manufacturing Company, a corporation of Nevada
Continuation of application Ser. No. 843,208, Sept. 29, 1959. This application Mar. 12, 1963, Ser. No. 264,682
2 Claims. (Cl. 156—230)

This application is a continuation of application Serial Number 843,208, filed September 29, 1959.

This invention relates to the manufacture of foam sheets by mixing two materials which react together, such as an isocyanate terminated polyurethane resin and a catalyst, thereby forming a thin porous sheet, and more particularly to the manufacture of such sheets having a coating of pressure-sensitive adhesive.

Heretofore thin foam sheets have been made by first foaming a relatively thick slab and then slicing with knives into thin sheets. As thus formed the slab has a skin of non-uniform texture and density which must be discharged and represents a high waste. Furthermore the slicing is costly and the thin sheets thus produced are limited in size to the length and width of the original slab. Moreover, the cut surfaces present a rough, deeply indented texture, in contradistinction to a smooth, strong well-knit surface. Foam sheets have also been made by feeding a reactable mixture between sheets of paper, cloth or metal and drawing such a web through the confines of two rigid plates while the reactable liquid is foaming. In such a process there is a severe limitation upon the lightness and uniformity of foam that can be produced, control of width, and the speed at which such a web can be run because of the pressure and consequent friction exerted by the foaming mixture upon the confining plates.

When pressure-sensitive adhesive is applied to a split foam sheet having a rough, deeply indented surface, the adhesive strikes in, leaving an inadequate coating on the surface or requiring an excessive amount of adhesive or both. To overcome this difficulty it has been proposed to laminate a transparent impervious film to the rough surface and apply the adhesive to the film. This is objectionable because it requires the additional film and also an additional operation.

Objects of the present invention are to avoid the aforesaid difficulties, to eliminate the necessity of slicing preformed slabs, to eliminate the tough skin waste, to obtain a better foam structure at the surface, to produce a sheet which, instead of having a thick rough skin, has a thin smooth surface, which is uniform in structure throughout its thickness, which is uniform in thickness and can be made as thin as desired, which is porous at the surface as well as in the interior, which is permeable to gases, and whose surface pores are so fine that the surface will adhere strongly and continuously to pressure-sensitive adhesive, and to produce a foam sheet having a pressure-sensitive coating which is uniform in thickness, which has a smooth exposed surface, and which requires a minimum amount of adhesive for good adhesion.

In one aspect the invention involves a method which comprises applying to a release sheet a coating of pressure-sensitive adhesive, and subsequently applying foam material to the coated side of the release sheet. Preferably the aforesaid coating is gelled before the foam material is applied, that is most of the solvent used in applying the coating is evaporated leaving the coating relatively dry but tacky in a well-known manner. The foam material may be foamed against said coated side or it may be cured before being applied to said coating. The bond between the adhesive and the foam is stronger than that between the adhesive and the release sheet so that the adhesive remains on the foam sheet when the release sheet is peeled off. More specifically the method comprises forming a foam layer with a smooth microporous skin, applying to a release sheet a coating of pressure-sensitive adhesive, and subsequently laminating said layer and sheet with said coating.

In another aspect the present invention involves a method comprising the steps of feeding two cover sheets along paths which converge to form therebetween a crotch terminating in a metering slit or nip and thence continue in approximate parallelism through a foaming region, mixing the materials and feeding the mixture through the aforesaid crotch and slit so that the mixture is metered before foaming takes place, one sheet being free to move away from the other sheet in the aforesaid region so that the foaming does not build up substantial pressure in the layer of foam, thereby to produce a foam layer having uniform thickness and porous structure throughout its thickness and having a thin smooth mircoporous skin, and adhesively joining said skin to a layer of pressure-sensitive adhesive, the pores of the skin being too small to make the skin rough, whereby the adhesive layer is uniform in thickness and has a surface which is not irregular and requires a minimum amount of adhesive.

In another aspect the invention involves a foam sheet having a thin microporous smooth skin and a layer of pressure-sensitive adhesive adhering to said skin, the adhesive layer being uniform in thickness and having an exposed surface which is not irregular.

Air tends to be trapped between the release sheet and foam sheet where they are laminated together, thereby mitigating against a continuous bond. By using a foam sheet which has a porous skin, in contradistinction to the usual impervious skin, this tendency is avoided because the air escapes readily through the foam. By making the skin microporous it is smooth and when coated with adhesive it affords a coating which has a smooth surface and uniform thickness and requires a minimum amount of adhesive.

The cover sheets may be made of any flexible material such as paper, cloth, plastic, foil, etc., and each sheet which is to be removed after the foam sheet is formed is siliconized or otherwise made in the form of a release sheet so as to be peelable from the cured foam and from the aforesaid adhesive.

For the purpose of illustration typical embodiments of the invention are shown in the accompanying drawings in which.

Figure 1:
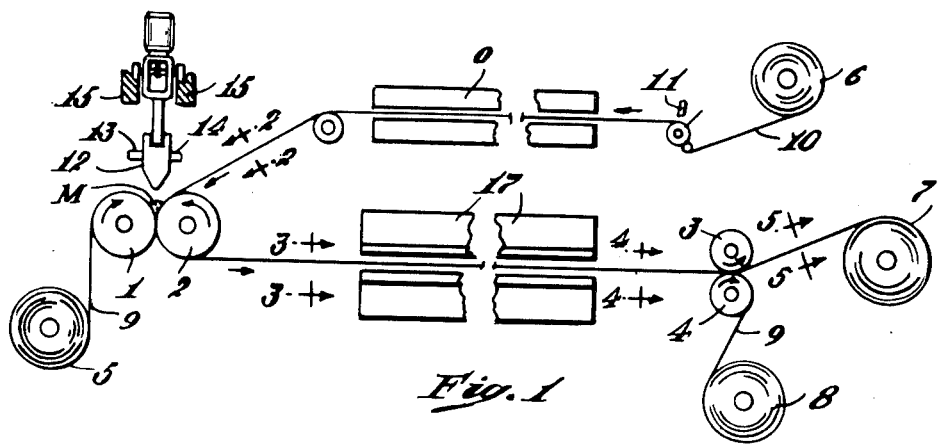
FIG. 1 is a side view illustrating one method.
Figure 2:
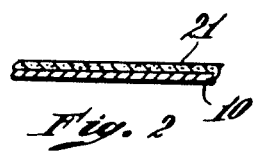
FIGS. 2 to 5 are sections on lines 2—2 to 5—5, respectively, of FIG. 1.
Figure 3:
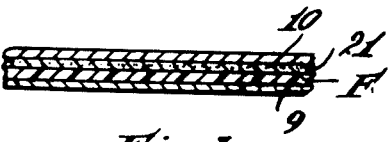
Figure 4:
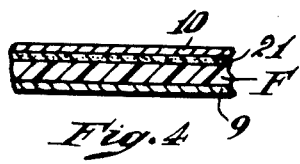
Figure 5:
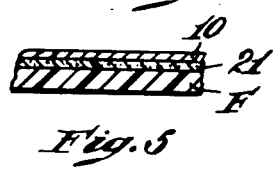
Figure 6:
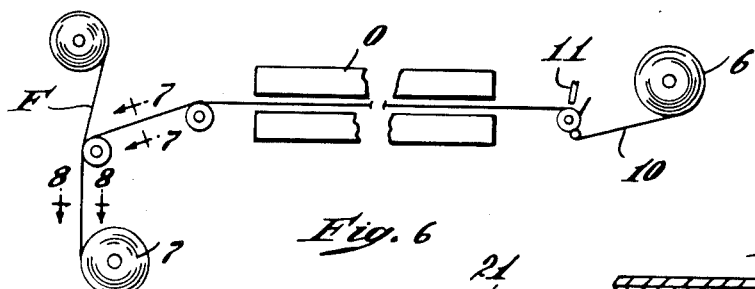
FIG. 6 is a view like FIG. 1 showing a modified method.
Figure 7:
Figure 8:
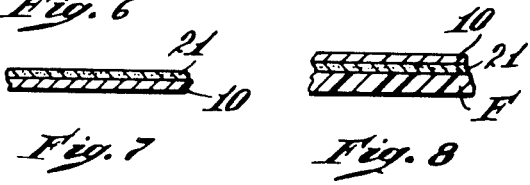

FIGS. 7 and 8 are sections on lines 7—7 and 8—8 of FIG. 6.

The particular embodiment illustrated in FIGS. 1 to 5 comprises two metering rolls 1 and 2 spaced horizontally in close juxtaposition to form a crotch therebetween, and two feed rolls 3 and 4 at the other end of the machine, the rolls turning in the direction of the arrows. Feeding between these rolls from supply reels 5 and 6 to take-up reels 7 and 8 are the aforesaid cover sheets 9 and 10. The foam material M is fed into the aforesaid crotch from a mixing chamber 12 having inlets 13 and 14 for the catalyst and resin, respectively, the mixing chamber being moved back and forth lengthwise of the crotch along a track 15 through suitable mechanism of well known construction. Thus the mixture M is distributed uniformly along the crotch and feeds between the metering rolls before the mixture begins to foam substantially. Then the mixture is carried between sheets 9 and 10 through heater 17 where foaming and curing takes place, the foam sheet being completely cured before reaching the feed rolls 3 and 4 where the cover sheet 9 is peeled off and wound on take-up reel 8, the foam sheet and release sheet 10 being wound on take-up reel 7.

While any foamable material may be used, the invention is especially useful with a polyurethane resin. Typical examples are the following:

*Example 1*

An isocyanate terminated polyester prepared by the reaction of a polyester resin (the reaction product of diethylene glycol with adipic acid and a triol) with toluene diisocyanate (commercially available as Nopcofoam Sx59R) having an isocyanate content of 11½% is continuously mixed in the proportion of 1 part resin to .065 part of a catalyst mixture prepared by mixing 1.25 parts of N. Methylmorpholine, 0.25 part triethylene diamine, 2.00 parts water, and 1.5 parts of a water in oil emulsifier (commercially available as Witco 77.86). The amount of water corresponds to 124% theoretical or 24% excess water. The cream time of mix is about 5 secs. The combined formulation is delivered continuously into the nip of the metering rolls and taken away between two sheets of a suitable releasing sheet at a rate such that no build-up of foamable material occurs in the nip. Using the above formula the resin mixture should be delivered at a rate of about 2.43 lbs./min. Under the particular conditions of this example the resin temperature at time of delivery to mixer housing should be less than 77° F. to avoid premature reaction and production of foam in the nip. The nip clearance of the metering rolls between the two sheets of releasing paper may be adjusted to about .008 inch. Under these conditions the speed of the paper should be about 15 ft./min. The foamable mix is allowed to foam between the two sheets at 75° F. for 2 minutes, then heated to 250° F. for 1 minute to obtain a cure of the foam sufficient to permit handling of the foamed sheet. Density of the foam is 2.6 lbs. per cu. ft.

*Example 2*

An isocyanate adduct of a polypropylene glycol with toluene diisocyanate having an isocyanate content of 10.5% (Nopcofoam 3073) is mixed continuously in the proportion of 1 part resin to 0.060 part of a catalyst mixture prepared by mixing 1.5 parts N. Methylmorpholine, 0.5 part triethylene diamine, 2.4 parts water, 1.2 parts of a 30% water emulsion of a silicone resin (Union Carbide's Silicone Emulsion XLE 452). The amount of water corresponds to 115% theoretical or 15% in excess. The cream time of the mix is 11 seconds. The foamable mix is foamed according to Example 1 with the exception that foaming is carried out at elevated temperatures. The top surface is exposed to a temperature of 200° F. and the bottom surface to 150° F. After 1½ minutes the foam is subjected to a temperature of 250° F. for 2 minutes or until cured sufficiently to be handled. Density of the foam is about 2.0 lbs. per cu. ft.

Cream times are given since this determines the maximum length of time the foamable mix can remain in the trough of the metering rolls. In general a cream time of 5 secs. is the minimum, it being preferred to have a cream time of 10 secs. By cream time is meant that the time required for the foamable mix to show the first evidence of foaming. This shows up generally by the resin changing from translucent to opaque.

From the foregoing it will be understood that the foamable material passes between the metering rolls before substantial foaming takes place. The path through the heaters is deeper than the combined thickness of the cover sheets and foam sheet after foaming is completed so that the foam sheet is free to expand without building up internal pressure. Thus the method affords a foam sheet which has uniform thickness and uniform structure throughout its thickness, and a thin smooth microporous skin, the pores being too small to make the skin rough.

According to this invention the cover sheet 10 has a coating 21 of pressure-sensitive adhesive. As the cover sheet 10 feeds from the supply reel 6 to the meter roll 2 the coating of adhesive is applied at 11 in well-known manner and dried by an oven 0. Thus when the release sheet 10 feeds through the metering slit the pressure-sensitive coating is exposed to the foam material so that in the foaming process the foam layer F adheres to the pressure-sensitive adhesive. By siliconizing the release sheet 10 in well-known manner it may be peeled off the pressure-sensitive layer, leaving the adhesive layer tightly bound to the foam layer. Likewise if sheet 9 is to be removed it too should be siliconized.

The modification illustrated in FIGS. 6 to 8 is like the embodiment illustrated in FIGS. 1 to 5 and corresponding parts are correspondingly designated. However instead of foaming material against the pressure-sensitive coating, the foam layer F is completely foamed and preferably cured before it is laminated to the release sheet 10 through the medium of the pressure-sensitive coating 21. By virtue of the porous skin of the foam the air which is trapped between the two sheets readily escapes through the foam, affording a tight continuous bond between the foam and adhesive, and inasmuch as the pores are minute the skin is smooth and the adhesive coating is uniform in thickness and a minimum quantity of adhesive is required.

A typical example of a coated release sheet comprises glassine paper siliconized in well-known manner and coated to a thickness of about one mil with the following composition, where the parts are by weight:

Polyvinyl ethyl ether, high viscosity grade EHBM, 25% solids in Hexane obtained from Carbide & Carbon _____ 32
Polyvinyl ethyl ether, low viscosity grade EHBC, 80% solids in Hexane obtained from Carbide & Carbon _____ 10
Hard Nevillac Resin, obtained from Neville Co. ____ 4
Deenax, an antioxidant _____ 0.2
Toluol, to thin (approx.) _____ 50

By coating the adhesive on the release sheet instead of the foam sheet, the difficulty of coating a soft compressible sheet is avoided and by drying the adhesive before contacting the foam it is not absorbed substantially by the foam.

It should be understood that the present disclosure is for the purpose of illustration only and that this invention includes all modifications and equivalents which fall within the scope of the appended claims.

We claim:

1. In making a resilient foam sheet with a coating of pressure-sensitive adhesive on one surface thereof, the method comprising
    providing a cover sheet with a release surface coated with a pressure-sensitive adhesive,
    feeding said cover sheet and a second cover sheet along paths which converge to form therebetween a crotch terminating in a metering slit and thence continue through a foaming region,
    feeding a mixture of materials which together produce foam with a microporous surface through said slit between said cover sheets and in contact with said adhesive before substantial foaming takes place,
    foaming said foam sheet in contact with said adhesive and in the absence of substantial pressure, curing the foam sheet between the cover sheets, and
    stripping away the cover sheet from the adhesive,
    whereby a foam sheet is formed with a microporous surface coated substantially entirely and directly on said surface with a tacky, pressure-sensitive adhesive.

2. In making a resilient foam sheet with a coating pressure-sensitive adhesive on one surface thereof, the method comprising provide a cover sheet with a release surface, feeding said cover sheet and a second cover sheet along paths which converge to form therebetween a crotch terminating in a metering slit and thence continue through a foaming region, feeding a mixture of materials which together produce foam with a microporous surface through said slit between said cover sheets and in contact with said release surface before substantial foaming takes place, foaming said foam sheet in contact with said release surface and in the absence of substantial pressure, curing the foam sheet between the cover sheets, stripping away the cover sheet from the foam sheet, providing a release sheet having a coating of pressure-sensitive adhesive, laminating the foam surface exposed by removal of said cover sheet to the pressure-sensitive adhesive, and stripping away the release sheet from the adhesive, whereby a foam sheet is formed with a microporous surface coated substantially entirely and directly on said surface with a tacky, pressure-sensitive adhesive.

References Cited by the Examiner

UNITED STATES PATENTS

| | | | |
|---|---|---|---|
| 1,960,137 | 5/1934 | Brown. | |
| 2,191,704 | 2/1940 | Bennett | 156—230 |
| 2,404,073 | 7/1946 | Karfiol et al. | 264—132 |
| 2,542,048 | 2/1951 | Nagel | 161—159 |
| 2,943,008 | 6/1960 | Saunders | 161—159 |
| 2,962,407 | 11/1960 | Aykanian | 264—47 |
| 3,039,907 | 6/1962 | Scholl | 156—247 XR |
| 3,047,449 | 7/1962 | Coble | 264—47 |
| 3,049,463 | 8/1962 | Kallander et al. | 156—230 |
| 3,117,171 | 1/1964 | Voelker | 264—47 |

ALEXANDER H. BRODMERKEL, *Primary Examiner.*

ROBERT F. WHITE, *Examiner.*

P. E. ANDERSON, *Assistant Examiner.*